(12) United States Patent
Li et al.

(10) Patent No.: US 10,190,595 B2
(45) Date of Patent: Jan. 29, 2019

(54) GAS TURBINE ENGINE BLADE PLATFORM MODIFICATION

(71) Applicant: General Electric Company, Schenectady, NY (US)

(72) Inventors: Qiang Li, Mason, OH (US); Aaron Phillip King, Lebanon, OH (US); Toby George Darkins, Jr., Loveland, OH (US); Anthony Joseph Maurer, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 326 days.

(21) Appl. No.: 14/854,237

(22) Filed: Sep. 15, 2015

(65) Prior Publication Data

US 2017/0074281 A1   Mar. 16, 2017

(51) Int. Cl.
*F01D 5/14* (2006.01)
*F01D 5/26* (2006.01)
(Continued)

(52) U.S. Cl.
CPC .............. *F04D 29/324* (2013.01); *F01D 5/14* (2013.01); *F01D 5/26* (2013.01); *F01D 5/303* (2013.01);
(Continued)

(58) Field of Classification Search
CPC ... F01D 5/14; F01D 5/141; F01D 5/16; F01D 5/26; F01D 5/3007; F01D 5/3015;
(Continued)

(56) References Cited

U.S. PATENT DOCUMENTS 3,923,420 A   12/1975  Chifos
4,019,832 A    4/1977  Salemme et al.
(Continued)

OTHER PUBLICATIONS

A. Duden, I. Raab, and L. Fottner. Controlling the Secondary Flow in a Turbine Cascade by 3D Airfoil Design and Endwall Contouring. No. 98-GT-72 in Turbo Expo. ASME, 1998.*
(Continued)

*Primary Examiner* — Logan Kraft
*Assistant Examiner* — Christopher R Legendre
(74) *Attorney, Agent, or Firm* — General Electric Company; Brian Overbeck

(57) ABSTRACT

A gas turbine engine compressor blade includes an airfoil and a root section connected to a blade platform therebetween and an at least partially curved cropped corner of the blade platform. The corner shape and size may avoid resonance of blade during engine operation. The corner may be J-shaped including a straight section extending from the pressure side edge towards the suction side edge of the platform and a curved section extending from the straight section to an uncropped portion of the platform trailing edge of the platform. A method of designing the cropped corner includes choosing shapes and sizes of the cropped corner for numerically analyzing and determining shape and size for the cropped corner using a numerical model to iteratively numerically analyze aerodynamically the cropped platform with different shapes and sizes of the cropped corner. The numerical model may be validated with engine or component testing of the blade having a cropped platform with at least one of the shapes and sizes.

4 Claims, 5 Drawing Sheets

(51) Int. Cl.
  *F01D 5/30* (2006.01)
  *F04D 29/32* (2006.01)
  *F04D 29/66* (2006.01)

(52) U.S. Cl.
  CPC .......... *F01D 5/3038* (2013.01); *F04D 29/668* (2013.01); *F05B 2240/80* (2013.01); *F05D 2220/32* (2013.01); *F05D 2240/30* (2013.01); *F05D 2240/80* (2013.01); *F05D 2250/712* (2013.01); *F05D 2260/96* (2013.01); *Y02T 50/673* (2013.01)

(58) Field of Classification Search
  CPC .... F01D 5/3023; F01D 5/303; F05B 2240/80; F05B 2240/801; F05D 2240/30; F05D 2240/80; F05D 2240/81; F04D 29/668; F04D 29/321; F04D 29/322; F04D 29/324; B23P 15/02; B23P 15/04
  See application file for complete search history.

(56) References Cited

U.S. PATENT DOCUMENTS

| | | | |
|---|---|---|---|
| 4,465,432 A | 8/1984 | Mandet et al. | |
| 4,878,811 A | 11/1989 | Jorgensen | |
| 5,022,822 A | 6/1991 | Sincere | |
| 5,271,718 A * | 12/1993 | Mitchell, Jr. | F01D 5/22 416/193 A |
| 6,532,656 B1 | 3/2003 | Wilkins et al. | |
| 6,902,376 B2 | 6/2005 | Gautreau et al. | |
| 7,594,799 B2 | 9/2009 | Miller et al. | |
| 8,152,445 B2 * | 4/2012 | Guemmer | F01D 9/04 415/58.5 |
| 8,206,116 B2 | 6/2012 | Pickens et al. | |
| 8,366,400 B2 | 2/2013 | Ochiai et al. | |
| 8,387,358 B2 | 3/2013 | Danis et al. | |
| 8,439,643 B2 * | 5/2013 | Kuhne | F01D 5/143 416/193 A |
| 8,579,590 B2 | 11/2013 | Nadvit et al. | |
| 8,814,517 B2 * | 8/2014 | Ellis | F01D 5/081 29/527.6 |
| 2009/0297351 A1 | 12/2009 | Brahmasuraih | |
| 2017/0074281 A1 * | 3/2017 | Li | F04D 29/324 |

OTHER PUBLICATIONS

"Experimental Tuning of Resonance Frequencies of a Turbine Blade by a Laser Scanning Vibrometer", by G.L. Rossi, C. Santolini, E.P. Tomasini, P. Nava, M. Pinzauti, Italy.

* cited by examiner

GAS TURBINE ENGINE BLADE PLATFORM MODIFICATION

BACKGROUND OF THE INVENTION

Technical Field

The present invention relates to gas turbine engine blade platforms.

Background Information

Gas turbine engines blades found in a high pressure compressor typically include a blade platform integrally disposed between an airfoil and a blade root for mounting the blade in a slot of a compressor disk. Under certain rotor speed and engine operating conditions, the excitation of certain modes of the blades from unsteady-state air flow on the blade platform can cause the blade platform corner to lose material. Consequentially, it can cause escalating downstream damage. However, complete redesign of a compressor blade for an existing matured engine is very costly and time-consuming as well as not being easy, and in some cases, impossible to retro-fit.

Thus, it is desirable to have a platform redesign and method of retrofitting blades with blades having redesigned platforms that avoid excitation of certain modes of the blades from unsteady-state air flow on the blade platform act to avoid the blade platform corner losing material.

SUMMARY OF THE INVENTION

A gas turbine engine compressor blade includes an airfoil and a root section connected to a blade platform therebetween, the airfoil extends in a chordwise direction between airfoil leading and trailing edges, and an at least partially curved cropped corner of the blade platform.

The at least partially curved cropped corner may have a shape and size that avoids resonance of the blade during operation of the gas turbine engine. The at least partially curved cropped corner may be a J-shaped cropped corner including a straight section extending from and perpendicular to a pressure side edge part way towards a suction side edge of the platform and a curved section extending from the straight section to an uncropped portion of a platform trailing edge of the platform. The platform may further include parallel platform leading and trailing edges extending circumferentially or tangentially and corresponding to the airfoil leading and trailing edges respectively and parallel pressure and suction side edges extending axially between the platform leading and trailing edges.

The shape and size of the at least partially curved cropped corner may be calculated iteratively using a numerical model to iteratively numerically analyze aerodynamically the cropped platform with the differently shaped and sized cropped corners. The numerical model may be validated with engine or component testing of a blade having a cropped platform with at least one of shaped and sized cropped corners.

A gas turbine engine assembly may include a plurality of the gas turbine engine compressor blades mounted on a disk.

A method of designing the gas turbine engine compressor blade cropped platform includes choosing shapes and sizes of the cropped corner for numerically analyzing and determining shape and size for the cropped corner of the compressor blade cropped platform by using a numerical model to iteratively numerically analyze aerodynamically the cropped platform with the different shapes and sizes of the cropped corner. The numerical model may be validated with engine or component testing of a blade having a compressor blade cropped platform with at least one of the shapes and sizes of the cropped corner. The cropped corner may have a shape and size that avoids resonance of the blade during operation of the gas turbine engine.

BRIEF DESCRIPTION OF THE DRAWINGS

The invention, in accordance with preferred and exemplary embodiments, is more particularly described in the following detailed description taken in conjunction with the accompanying drawings in which.

DESCRIPTION

Figure 1:
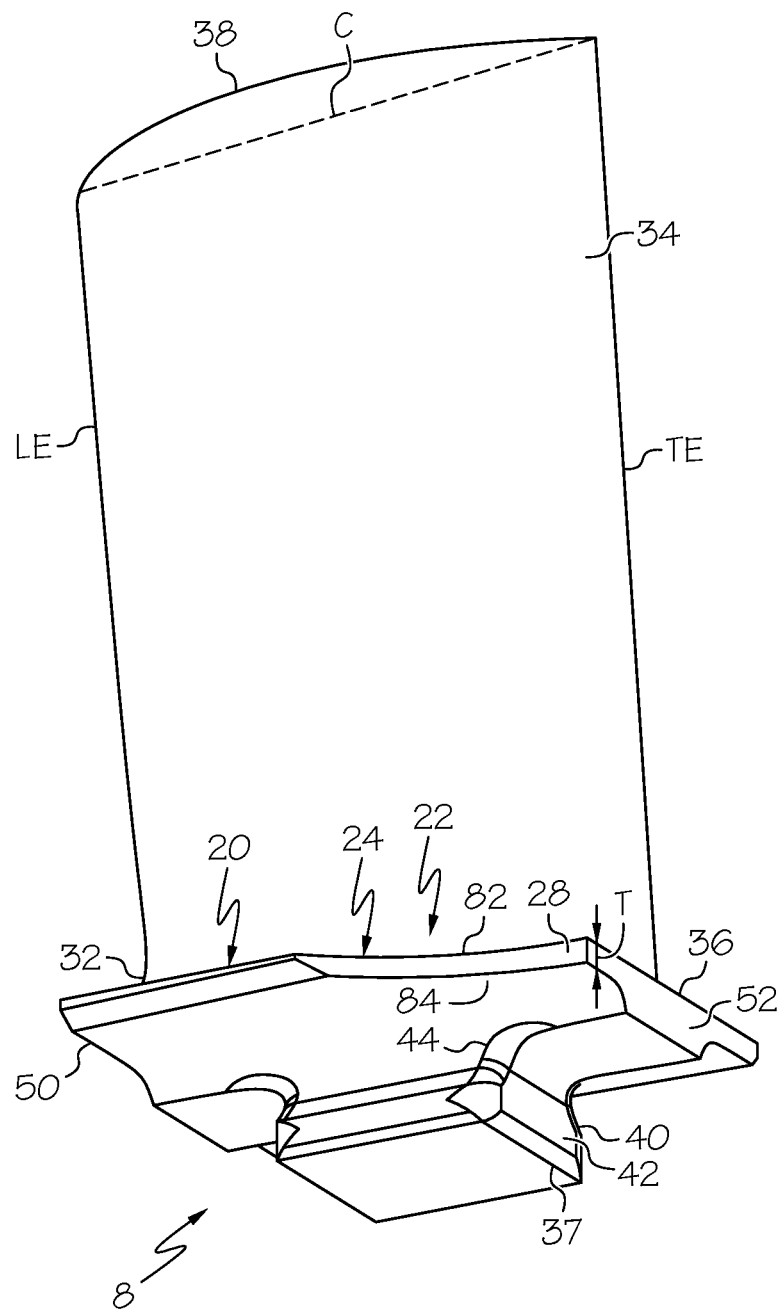
FIG. 1 is a perspective view illustration of an exemplary gas turbine engine blade with a cropped platform.
Figure 2:
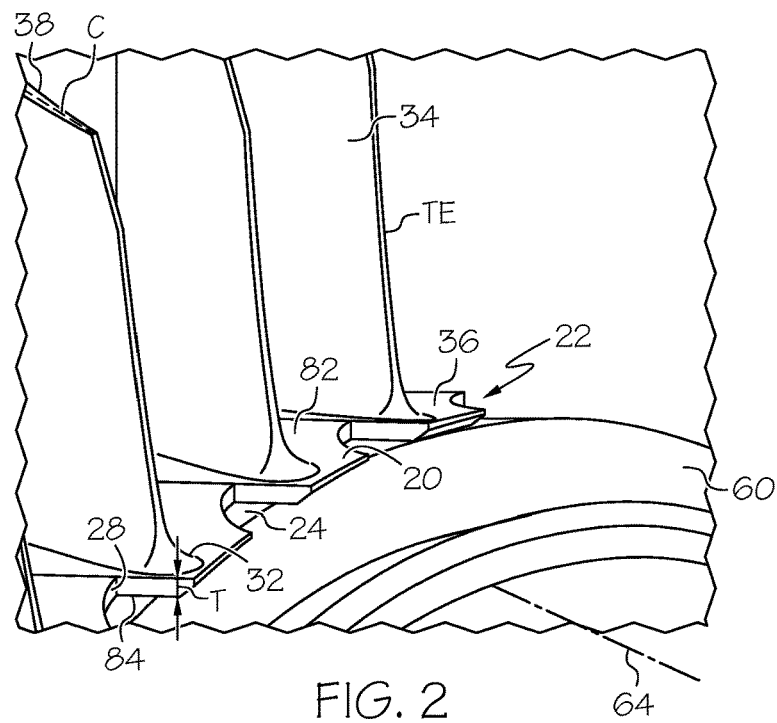
FIG. 2 is an axial perspective view illustration of the blade illustrated in FIG. 1 mounted on a disk.
Figure 3:
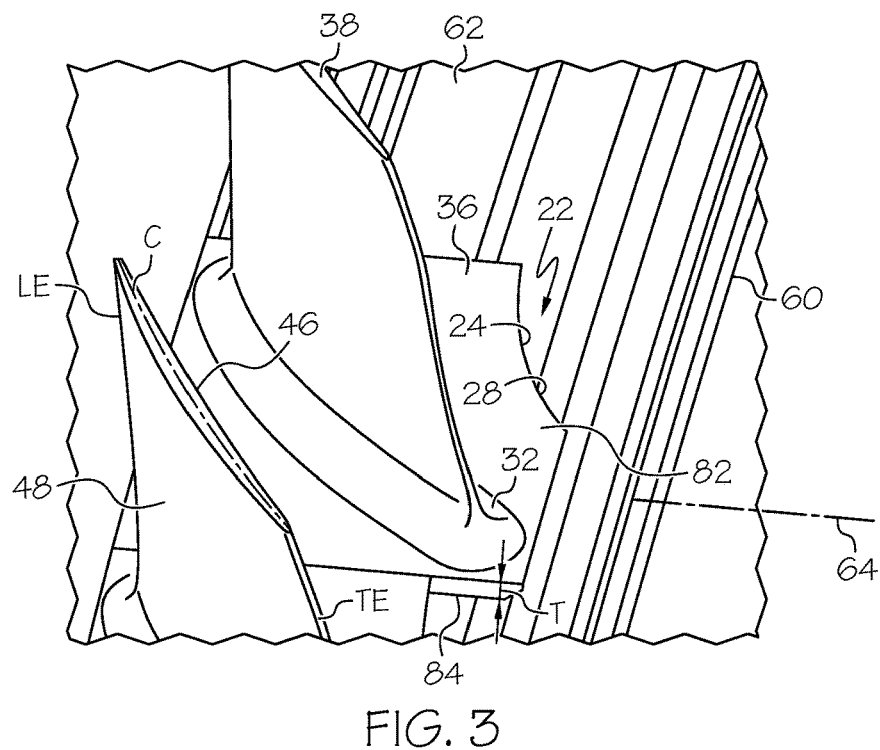
FIG. 3 is a top looking down perspective view illustration of the blade mounted in a slot of the disk illustrated in FIG. 2.

Illustrated schematically is an exemplary turbofan gas turbine engine compressor blade illustrated in FIGS. 1-3. The compressor blade 8 includes a blade platform 36 disposed between an airfoil 34 and a root section 40. The airfoil 34 and the root section 40 are connected to the blade platform 36. The airfoil 34 extends radially outwardly or away from an airfoil base 32 located on the blade platform 36 to a blade or airfoil tip 38. The root section 40 extends radially inwardly or away from the platform 36 to a blade root or dovetail 42 at a radially inward end 37 of the root section 40. The blade root or dovetail 42 is connected by a blade shank 44 to the platform 36 at a radially inward end 37 of the root section 40. A chord C of the airfoil 34 is the line between the leading edge LE and trailing edge TE at each cross-section of the blade. The airfoil 34 extends in the chordwise direction between an airfoil leading edge LE and an airfoil trailing edge TE of the airfoil 34. A pressure side 46 of the airfoil 34 faces in the general direction of rotation and a suction side 48 is on the other side of the airfoil 34 as further illustrated in FIG. 4.

Referring to FIGS. 1-4, the blade platform 36 may be square or rectangular as illustrated herein. The blade platform 36 includes platform leading and trailing edges 50, 52 extending circumferentially or tangentially with respect to a disk 60 upon which the blades are mounted and corresponding to the airfoil leading and trailing edges LE, TE, respectively. The root sections 40 of the compressor blades 8 are mounted in an annular slot 62 in the disk 60. The blade platform 36 further includes parallel pressure and suction side edges 56, 58 extending axially between the platform leading and trailing edges 50, 52 corresponding to the pressure and suction sides 46, 48 of the airfoil 34.

As illustrated in FIGS. 1 and 2, most airfoils 34 are mounted diagonally upon their respective platforms 36.

Thus, there are formed first and second platform corners 74, 76 which are relatively proximate the airfoil 34 and third and fourth platform corners 78, 80 which are relatively remote. As a result of the diagonal blade disposition, the platform will vary in stiffness and the near (stiffer) first and second corners 74, 76 will tend to vibrate at a low amplitude, whereas the remote (less stiff) third and fourth corners 78, 80 will vibrate at higher amplitudes. Under certain rotor speed conditions, the excitation of certain modes of the blades from the unsteady-state air flow on the blade platform caused the blade platform corner to vibrate and lose material.

However, complete redesign of the compressor blade 8 for a newly designed or especially for an existing matured engine is very costly and time-consuming as well as not retro-fit compatible. A modification of the blade platform 36 in the form of a cropped platform 20 disclosed herein is designed to prevent blade platform material loss by cropping an aft or downstream corner 22 of the platform 36. This is designed to reduce the blade vibratory stress at a platform crack initiation area and also relocate it away from the free edge of the blade. Furthermore, the frequency of the mode exciting the blade platform 36 is increased substantially to make the crossing of the frequency of excitation beyond operating range of the blade and engine, thus, avoiding resonance of the blade 8. A straight cropped trailing edge 30 may be a viable alternative as illustrated in FIG. 7.

Figure 4:
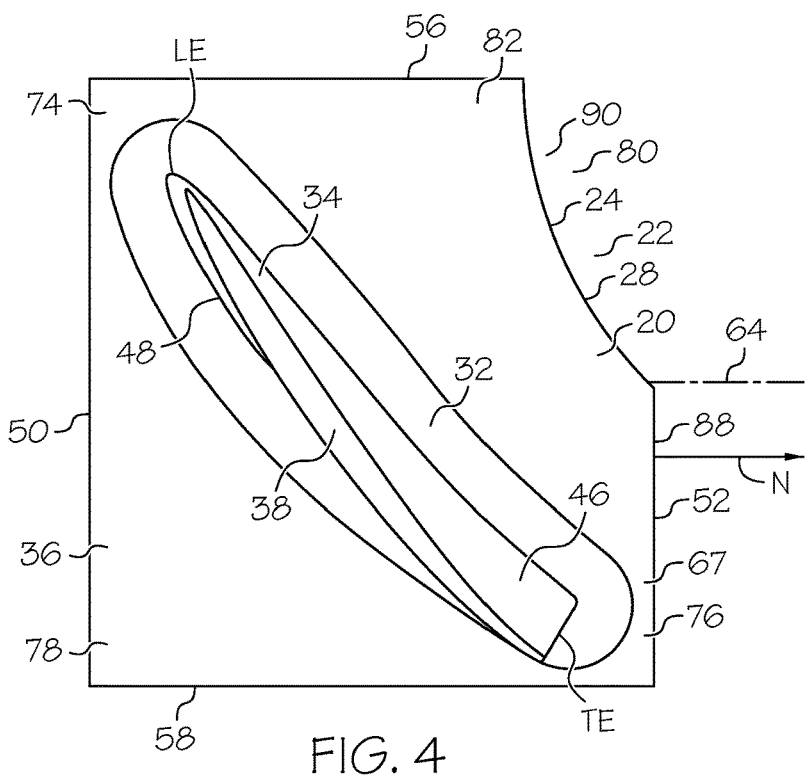
FIG. 4 is a top view illustration of a cropped corner of the platform of the blade illustrated in FIG. 1.
Figure 5:
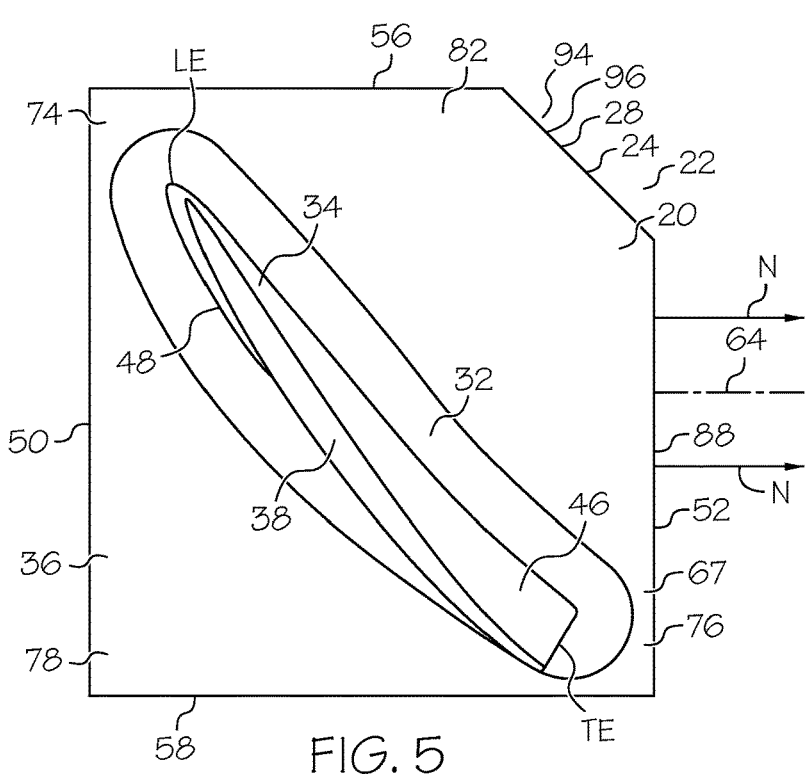
FIG. 5 is a top view illustration of a straight cropped corner of the platform of the blade illustrated in FIG. 1.
Figure 6:
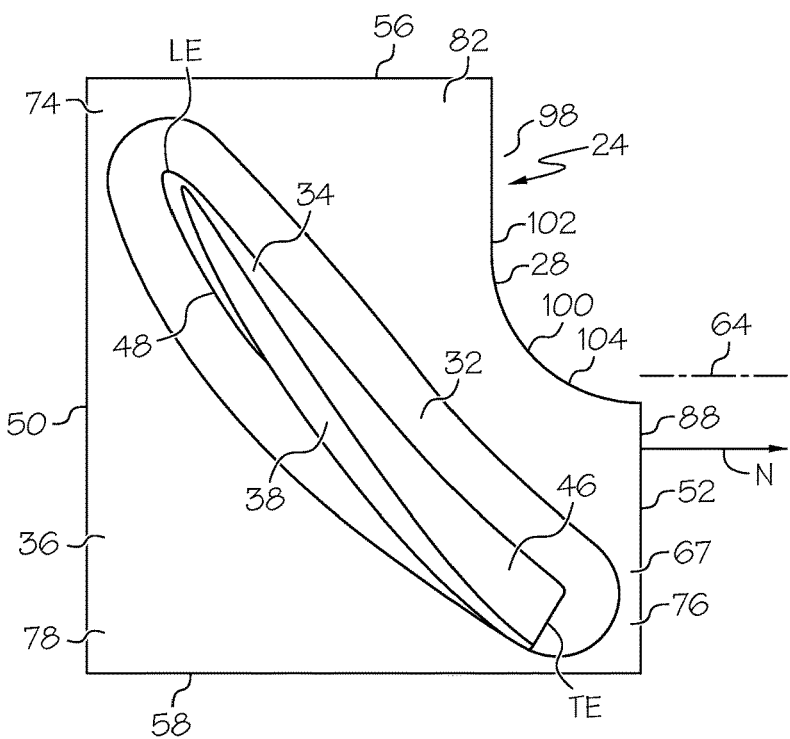
FIG. 6 is a top view illustration of a J-shaped cropped corner of the platform of the blade illustrated in FIG. 1.

FIGS. 4-6 illustrate different cropped corners 24 to be studied during the analysis to determine final shape and size provided herein of the platform 36 which are characterized by corresponding cropped platform edges 28. These shapes may also be analyzed by testing to confirm the accuracy of or validate the numerical model used for design optimization based on engine or component testing. As illustrated in FIGS. 1 and 2, the cropped corner 24 extends all the way through a thickness T of the platform 36 illustrated in FIG. 1. The thickness T extends from an airfoil side 82 to an oppositely facing root side 84 of the platform 36. The airfoil extends upwardly and away from the airfoil side 82 and the root section 40 extends downwardly and away from the root side 84 of the platform 36. A cropped platform edge 28 extends circumferentially or tangentially and aftwardly between the pressure side edge 56 and the platform trailing edge 52 along what is now a downstream facing flat cropped platform trailing edge 88 that has a normal N parallel to an axis 64 of the disk 60. The cropped corners 24 of the blade platform 36 are located and extend between the pressure side edges 56 and the platform trailing edges 52.

The shape of the cropped platform edge 28 is very important in avoiding mode vibratory excitation or natural frequencies. One method for determining or optimizing a shape of the cropped corner includes iterative steps using a numerical model, such as a 3-D flow-field model and computer program, to determine the final shape and size of the cropped platform edge 28. The numerical model for design optimization may be validated based on engine or component testing. One particular method of testing includes testing an instrumented high pressure compressor engine or rig test. The optimized design configuration may be validated with Laser Vibormetry or other types of vibration tests by comparing the key mode shapes and corresponding frequencies.

Figure 7:
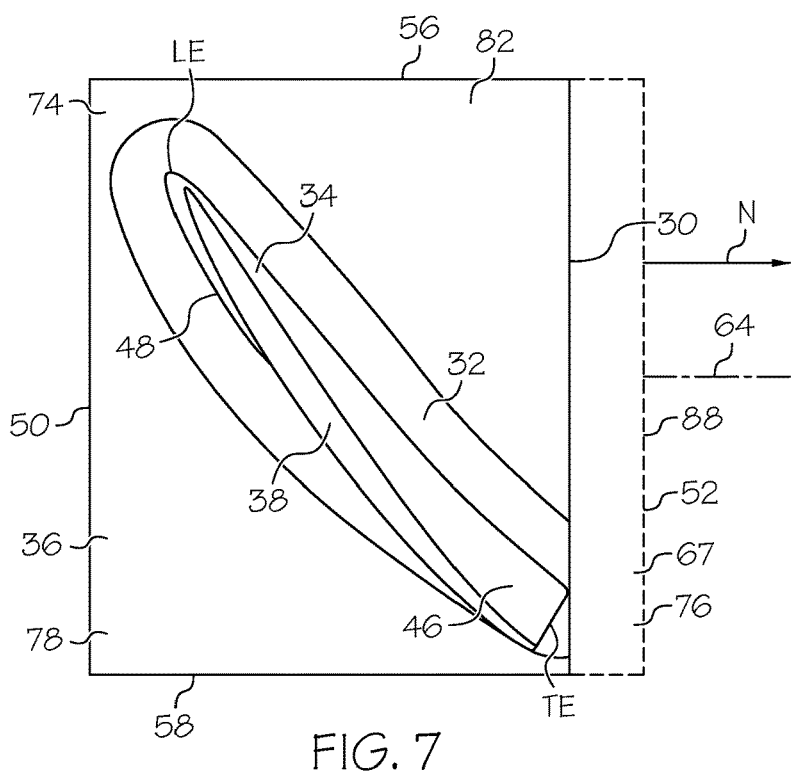
FIG. 7 is a top view illustration of a flat and straight cropped trailing edge of the platform of the blade illustrated in FIG. 1.

FIGS. 4-7 illustrate four differently shaped cropped corners 24 of the platform 36 and corresponding cropped platform edges 28 that may be used in the numerical analysis and may also be used for validation of the numerical analysis by hardware testing. FIG. 4 illustrates a curved cropped corner 90 and a corresponding curved cropped platform edge 28 extending from the pressure side edge 56 to an uncropped portion 67 of the platform trailing edge 52 of the platform 36. FIG. 5 illustrates a straight cropped corner 94 and a corresponding straight cropped edge 96 extending from the pressure side edge 56 to the uncropped portion 67 of the platform 36. FIG. 6 illustrates a J-shaped cropped corner and edge 98, 100. The J-shaped cropped corner and edge 98, 100 include a straight section 102 extending from and perpendicular to the pressure side edge 56 part way towards the suction side edge 58 of the platform 36. The J-shaped cropped corner and edge 98, 100 further include a curved section 104 extending from the straight section 102 to the uncropped portion 67 of the platform trailing edge 52 of the platform 36. FIG. 7 illustrates a straight cropped trailing edge 30 recessed from the original or uncropped platform trailing edge 52.

Figure 8:
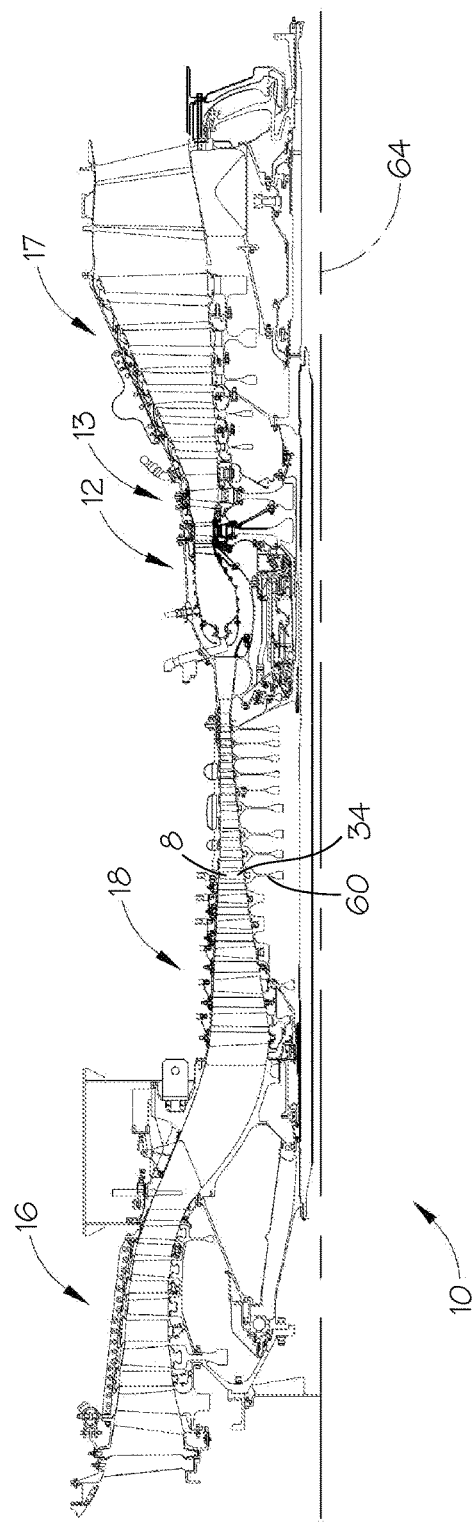
FIG. 8 is a schematical cross-sectional view illustration of an exemplary aircraft gas turbine engine including the blade illustrated in FIG. 1.

An exemplary embodiment of a gas turbine engine 10 schematically illustrated in cross-section in FIG. 8 includes the compressor blade 8 and airfoil 34. The engine 10 illustrated herein is an aircraft gas turbine engine 10 but the cropped platform may be also used in other gas turbine engines including marine and industrial gas turbine engines for example. The engine 10 has, in serial flow relationship, low pressure compressor (LPC) 16, a high 15 pressure compressor (HPC) 18, a combustion section 12, a high pressure turbine (HPT) 13, and a low pressure turbine (LPT) 17. The HPT 13 is drivingly connected to the HPC 18 and the LPT 17 is drivingly connected to the LPC 16. The compressor blade 8 is illustrated herein in the high 20 pressure compressor (HPC) 18.

Compressor blade platform corner losses may cause escalated downstream damages. However, complete redesign of compressor blade for the existing matured engine can be prohibitively costly. The blade platform modification disclosed herein is designed to prevent blade platform material loss by cropping a platform corner. It is not only significantly reduced vibratory stress but also makes crossing beyond operating range by increasing blade mode frequency.

While there have been described herein what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine compressor blade comprising:
an airfoil and a root section connected to a blade platform therebetween,
the airfoil extending in a chordwise direction between airfoil leading and trailing edges, and
an at least partially curved cropped corner of the blade platform, the at least partially curved cropped corner having a shape and size that avoids resonance of the blade during operation of the gas turbine engine, and the at least partially curved cropped corner is a J-shaped cropped corner including a straight section extending from and perpendicular to a pressure side edge towards a suction side edge of the blade platform and a curved section extending from the straight section to an uncropped portion of a platform trailing edge of the blade platform.

2. The blade as claimed in claim 1, wherein the blade platform further comprises a platform leading edge, the platform leading and trailing edges extending circumferentially or tangentially and corresponding to the airfoil leading and trailing edges respectively and the pressure and suction side edges being parallel and extending axially between the platform leading and trailing edges.

3. A gas turbine engine assembly comprising:
- a plurality of gas turbine engine compressor blades mounted on a disk,
- each of the blades including an airfoil and a root section connected to a blade platform therebetween,
- each airfoil extending in a chordwise direction between airfoil leading and trailing edges, and
- each blade further comprising: an at least partially curved cropped corner of the blade platform, the at least partially curved cropped corner having a shape and size that avoids resonance of the blade during operation of the gas turbine engine, and the at least partially curved cropped corner is a J-shaped cropped corner including a straight section extending from and perpendicular to a pressure side edge towards a suction side edge of the blade platform and a curved section extending from the straight section to an uncropped portion of a platform trailing edge of the blade platform.

4. The gas turbine engine assembly as claimed in claim 3, wherein each blade further comprises: a platform leading edge of the blade platform, the platform leading and trailing edges extending circumferentially or tangentially and corresponding to the airfoil leading and trailing edges respectively and the pressure and suction side edges being parallel and extending axially between the platform leading and trailing edges.

* * * * *